Figure 1:
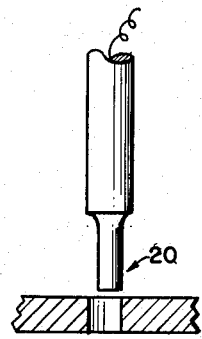

March 24, 1964     S. S. SCHNELL     3,126,536
AUTOMATIC EQUIPMENT CONTROL
Filed May 11, 1961     2 Sheets-Sheet 1

*INVENTOR.*
SOLOMON S. SCHNELL
BY
*ATTORNEY*

United States Patent Office 3,126,536
Patented Mar. 24, 1964

3,126,536
AUTOMATIC EQUIPMENT CONTROL
Solomon S. Schnell, 225—20 Mentone Ave.,
Laurelton 13, N.Y.
Filed May 11, 1961, Ser. No. 109,301
4 Claims. (Cl. 340—213)

This invention relates to control circuits. More particularly, it relates to a circuit for controlling electrically powered mechanical equipment in response to mishaps in such equipments.

In the operation of devices such as a press, during the feeding of a strip, for example, many malfunctions may occur. Such malfunctions may be a misfeeding, a piling up and a buckling of the strip.

It is, accordingly, an important object of this invention to provide control means which gives an indication of a malfunction of equipment substantially instantaneously and simultaneously halts the operation of such equipment.

It is a further object of this invention to provide means in accordance with the preceding object, which, when used with equipment wherein a strip is being fed, to also give a direct indication of the ending of the strip.

It is another object of this invention to provide means, in accordance with the preceding objects, which can be used with clutch operated mechanical equipment and which operates directly on such clutch.

It is still another object of this invention to provide control means, in accordance with the preceding objects, which includes an arrangement for providing an indication of failure of operation of such control means.

Generally speaking and in accordance with the invention there is provided, in combination with a mechanism of a given operational character and which includes an element capable of being in an electrically energized or de-energized state, such element being adapted to be in one of these states when the mechanism is operated, means in circuit with the element and responsive to a deviation in the operation of the mechanism for switching the element from the one state to the other of the states to halt the operation of the mechanism and to provide an indication of the deviation.

The features of this invention which are believed to be new are set forth with particularity in the appended claims. The invention itself, however, may best be understood by reference to the following description, when taken in conjunction with the accompanying drawings which show an embodiment of a control according to the invention.

Figure 5:
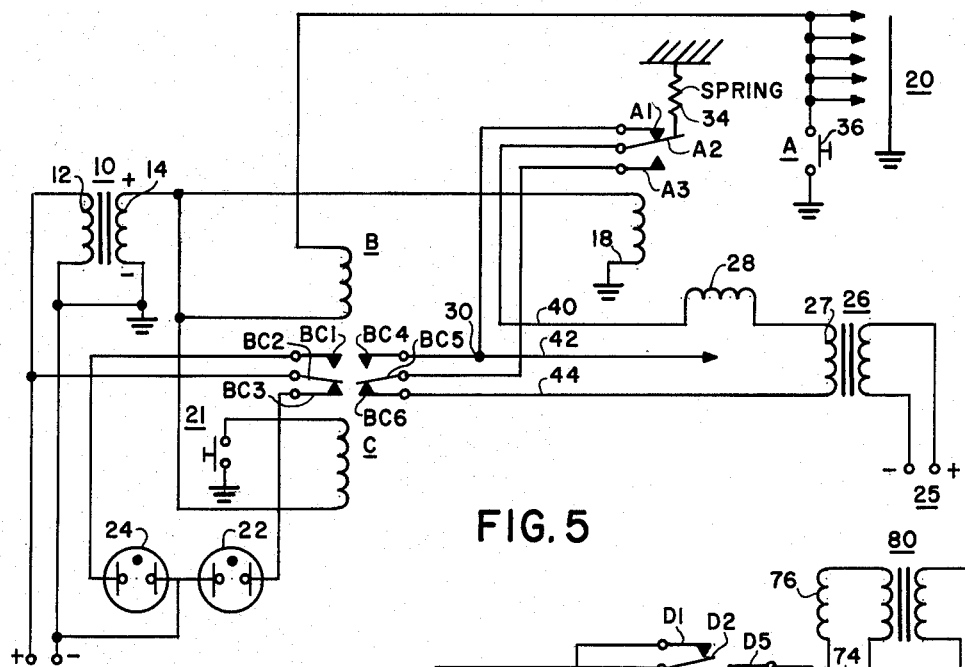
Figure 6:
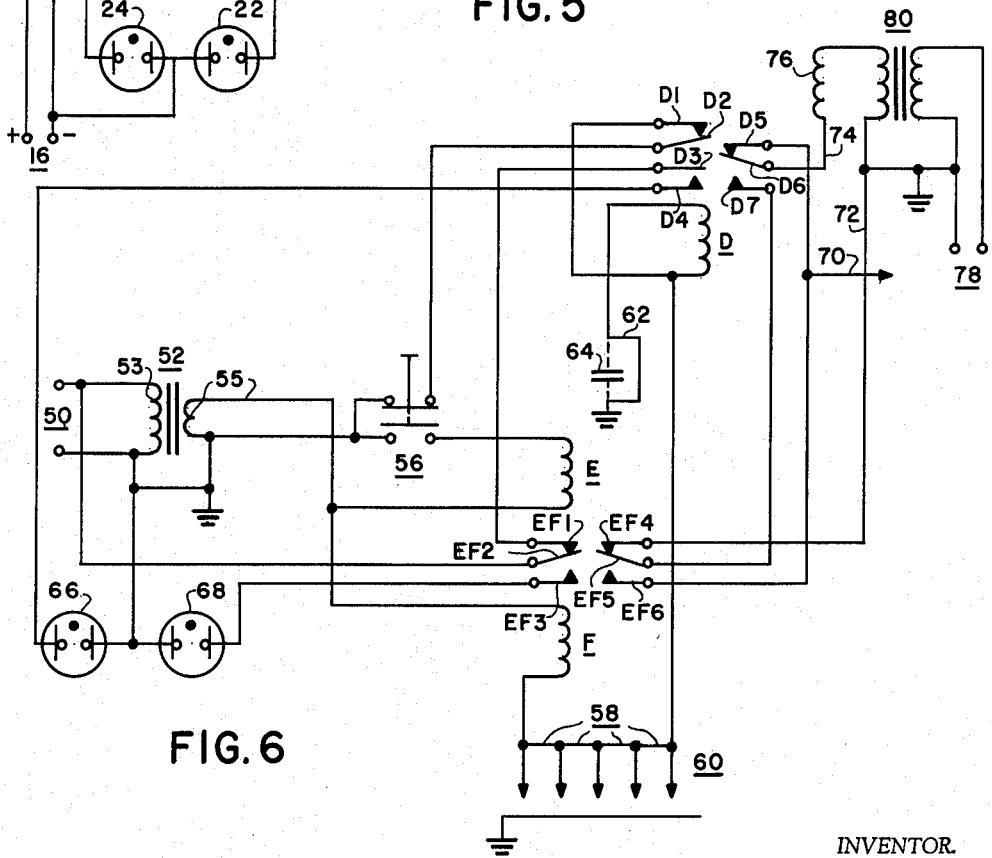

In the drawings:

FIGS. 1 to 4, respectively, show examples of types of mishaps sensed by the control circuit of the present invention to control mechanical equipment;

FIG. 5 is schematic depiction of one illustrative embodiment of the control circuit of the invention; and FIG. 6 is a schematic diagram of another embodiment of the device of the invention.

Figure 2:
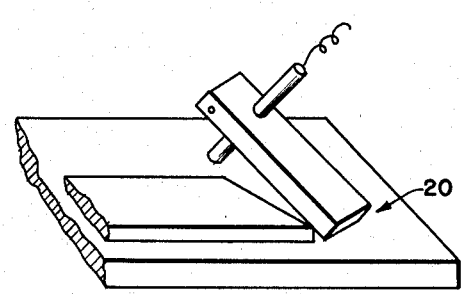
Figure 3:
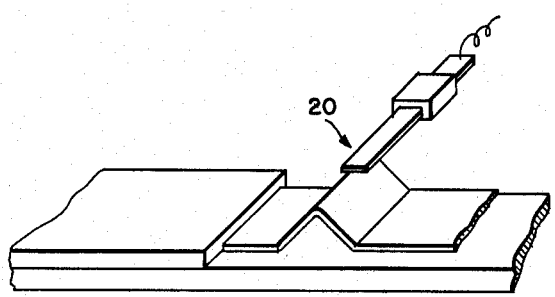
Figure 4:
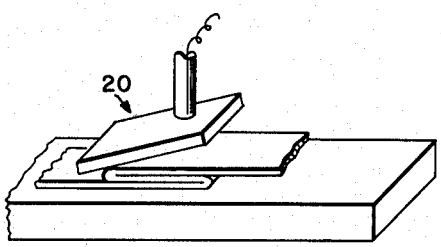

Referring now to FIGS. 1–4 there are shown typical examples of some of the types of malfunctions that this invention detects and effects the disabling of the mechanical equipment wherein such malfunctions occur. Thus, FIG. 1 depicts the sensing of a misfeeding; FIG. 2 indicates the sensing of the end of a strip which is being fed; FIG. 3 shows the sensing of a stock buckling; and FIG. 4 shows a material pile up. In each of the situations of FIGS. 1–4, a contact is made to ground to enable the completion of a circuit as is further explained hereinbelow; there being a conducting lead shown in each of these figures. For convenience, each of the structures shown in FIGS. 1–4, respectively, that contain conducting leads and which make contact with ground when a malfunction occurs, may conveniently be referred to as a probe.

In FIG. 5, wherein there is shown an embodiment of the invention, a transformer 10, comprising a primary winding 12, and a secondary winding 14, has applied thereto the power from source 16; source 16 suitably being A.C. line power (115 volts A.C., 60 cycle). In secondary winding 14, the line voltage is suitably transformed down to a smaller voltage such as about six volts A.C.

In circuit with secondary winding 14 is the operating coil of an electromagnetic relay A. The electrical circuit through such coil is suitably completed to ground through a jumper 18.

Associated with relay A are make-and-break contacts A1, A2, and A3, contacts A1 and A2 normally assuming the closed position when no power is applied to the circuit.

In series arrangement with the upper terminal of secondary winding 14 and a plurality of probes generally designated by numeral 20 is the operating coil of a relay B, and in series arrangement with the upper terminal of secondary winding 14 and a terminal of a normally open reset button switch 21 is the operating coil of a relay C, the other terminal of switch 21 being connected to ground.

Associated with both relays B and C are make and break contacts BC1, BC2, and BC3 and make and break contacts BC4, BC5 and BC6, contacts BC2 and BC3, and contacts BC5 and BC6 normally being in the closed position.

Contact BC3 is connected to one terminal of a neon indicator light 22, the other electrode of light 22 being connected to ground. Contact BC1 is connected to an electrode of indicator light 24, the other electrode of light 24 being connected to ground. Contact BC2 is connected to the upper terminal of primary winding 12 of transformer 10.

Contact BC5 is connected to contact A3 and contact BC4 is connected to contact A1. Contact A2 is connected to a terminal of a secondary winding 27, of a transformer 26, which has applied thereto the power from a line power source 25, through a solenoid 28, in the equipment being controlled, and either the junction 30 of contacts A1 and BC4, or contact BC6 is connected to the other terminal of secondary winding 27.

Relays B and C are operably mechanically interlaced by suitable mechanical means (not shown) and contacts A1 and A2 are interconnected by a spring 34. Probes 20 are connected to one terminal of a normally open switch 36, the other terminal of switch 36 being connected to ground. Lights 22 and 24 may suitably be of the neon type and of different colors, respectively, such as white and red. Relays A, B, and C may suitably be of the well-known A.C. operated type.

In considering the operation of the circuit of FIG. 5, let it be assumed that the equipment to be controlled is of the type wherein during the operation thereof, i.e., when it is running, solenoid 28 has to be in the energized state. In such situation, conductor 40 connected to contact 42 is connected to solenoid 28 and conductor 44 which may be conveniently designated as the "normally on" conductor is connected to the other terminal of secondary winding 27. Now, when power is applied to the circuit of FIG. 5 through transformer 10, a circuit is completed to ground through the upper terminal of primary winding 12, closed contacts BC2 and BC3 and the electrodes of light 22 whereby the latter is illuminated.

Simultaneously, a circuit is completed from the upper terminal of secondary winding 14 to ground through the coil of relay A and consequently contacts A2 and A3 associated therewith assume the closed position. The circuit for solenoid 28 is completed through conductor 40, closed contacts A2 and A3, closed contacts BC5 and BC6, and conductor 44. Accordingly, light 22 is illuminated and solenoid 28 is energized whereby the running of the equipment being controlled is not interrupted.

Let it now be assumed that because of a malfunction in the equipment being controlled, one of probes 20 makes contact with ground. In such situation, a circuit is completed to ground from the upper terminal of secondary winding 14 to ground through the operating coil of relay B. Consequently, contacts BC1 and BC2, and contacts BC4 and BC5 assume the closed position. In the latter situation, the circuit through light 22 is opened and a circuit is completed from primary winding 12 to ground through closed contacts BC1, BC2, and the electrodes of indicator light 24 whereby it is illuminated. Also, with the closing of contacts BC4 and BC5 due to the energizing of relay B, conductor 44 is removed from circuit thereby de-energizing solenoid 28 and consequently causing the equipment being controlled to stop running.

In the type of situation where solenoid 28 is normally in the de-energized state when the equipment is running, conductor 42 is connected to winding 27. It is seen that with no malfunction in the equipment, no circuit is completed through solenoid 28 since contacts BC4 and BC5 are in the open position. Accordingly, conductor 42 may conveniently be designated as the "normally off" conductor.

In the normally off situation when a malfunction occurs, i.e., when one of probes 20 makes contact with ground, whereby relay B is energized, the circuit is again opened through light 22, and completed through light 24 to illuminate the latter as previously explained hereinabove. Also, when contacts BC4 and BC5 assume the closed position due to the energization of relay B, a circuit is completed from a terminal of winding 27 through solenoid 28, conductor 40, closed contacts A2 and A3, closed contacts BC4 and BC5, and conductor 42 to the open terminal of winding 27. Consequently, solenoid 28 is energized, such energization in the normally off condition being a situation wherein the running of the equipment being controlled is again halted.

It is seen that conductor 40 is utilized in both situations, viz., where solenoid 28 is normally energized and de-energized respectively. Accordingly, conductor 40 may be conveniently designated as the "common" conductor.

In the event that a malfunction has occurred whereby relay B is in the energized state and such malfunction has been located and rectified, the pressing of push button switch 21 completes a circuit from the upper terminal of secondary winding 14 to ground through the operating coil of relay C to energize relay C whereby contacts BC2, BC3, and contacts BC5 and BC6 reassume their normally closed positions respectively. Thereby light 22 is again illuminated, relay B is de-energized, and the circuit of FIG. 5 is again conditioned for operation.

Switch 36 is included in the event that it is desired to test the circuit of FIG. 5 or to stop the equipment being controlled. It is seen that when switch 36 is closed, the same events ensue as when one of probes 20 makes contact with ground during actual operation. Thus, relay B is energized, light 24 is illuminated, light 22 is extinguished and the equipment being controlled stops running.

Provision is made in the circuit of FIG. 5 to indicate a power failure therein. Thus, assuming a situation where power should have been applied thereto through transformer 10, i.e., a switch associated with source 16 (not shown) has been closed and in fact there is a power failure, relay A is not energized. In the latter case, contacts A1 and A2 remain in the closed position. Consequently, in a "normally on" situation, wherein common conductor 40 and normally on conductor 44 are being utilized, no circuit is completed through solenoid 28, since contact A1 is connected to contact BC4. Likewise, in a normally off case, the circuit is completed between common conductor 40 and normally off conductor 42 through closed contacts A1 and A2 whereby solenoid 28 is energized. In both the normally on and normally off cases, when relay A is not energized, the operation of the equipment being controlled is halted. Of course, since no power is being applied to the circuit through transformer 10, neither of lights 22 or 24 is illuminated.

Referring now to FIG. 6 of the drawings, the A.C. power is applied to the circuit depicted therein from source 50, through a transformer 52, source 50 suitably being a line power. The line voltage is transformed down to a suitable value, such as about six volts A.C., in the secondary winding 55.

The upper terminal of the operating coil of a reset relay E is connected to a normally disconnected terminal of reset push button switch 56, the other normally disconnected terminal of switch 56, being connected to ground. A terminal of switch 56 is connected to the grounded terminal thereof and a terminal of the switch 56 is connected to a contact D1, associated with relay D, as will be further described hereinbelow.

The lower terminal of reset relay E, is connected to the upper terminal of an electromagnetic relay F, and an upper terminal of secondary winding 55, the lower terminal of relay F being connected to the leads generally designated by the numeral 58, to a plurality of probes 60. Associated in common with relay E and relay F are contacts EF1, EF2, and EF3, and contacts EF4, EF5 and EF6, respectively. Contacts EF1 and EF2 and EF4 and EF5 are normally in the closed position.

The electromagnetic relay D has its upper terminal connected to ground through a jumper 62, a switch 64, depicted as open, contacts 64 being in parallel arrangement with jumper 62. The lower terminal of relay D is connected to contact D1, associated therewith and also to probe leads 58. The contacts associated with relay D are contact pairs D1 and D2 and D3 and D4, and contacts D5, D6, and D7. Contact D2 is connected to a terminal of switch 56. Contact D3 is connected to contact EF1 and contact D4 is connected to an electrode of light 66, a second electrode of light 66 being connected to ground.

Contact D5 is connected to a conductor 70; contact D7 is connected to contact EF5, and contact D6 is connected to a conductor 74. Conductor 74 is connected to a solenoid 76, which is, in turn, connected to an A.C. voltage source 78, through a transformer 80, voltage source 78 suitably being of a line source, and conductor 72 or conductor 70 is connected to transformer 80, depending upon the adaptation of solenoid 76 and the equipment being controlled, as explained in connection with the circuit depicted in FIG. 5.

The operation of the circuit of FIG. 6 is substantially similar to the circuit of FIG. 5. Thus, when power is applied to the circuit, assuming that no probe 20 makes contact with ground, and also assuming that solenoid 76 is to be in the energized state whereby conductor 72 is connected to transformer 80, contacts D3 and D4, and contacts D6 and D7 associated with relay D assume the closed position, and contact D1 and D2 associated with relay D, open. In this situation, a circuit is completed from the upper terminal of the secondary winding 55 through the operating coil of relay F, leads 58 and operating coil of relay D. Relays E and F are mechanically latched and relay D is chosen to have a high impedance whereby the current through relay F is not sufficient to energize it and thereby effect a switching of the positions of the contacts associated in common with relays E and F. Accordingly, contacts EF1 and contacts EF2 and EF4 and EF5 remain in the closed position. In such case, the circuit is completed through solenoid 76 by means of conductors 74 and 72 and the equipment being controlled continues to run.

If a malfunction occurs in the equipment whereby one of the probes 60 makes contact with ground, the current from one upper terminal of secondary winding 55 through relay E to ground will be sufficient to energize relay F whereby contacts EF2 and EF3 and contacts EF5 and EF6 now assume the closed position, whereby the solenoid 76 is removed from circuit with source 78 and the equipment being controlled stops running.

It is readily seen in the situation where conductor 70 rather than conductor 72 is connected to transformer 80 and a malfunction is sensed, the closing of contacts EF5 and EF6 places solenoid 76 in circuit with source 78, whereby solenoid 76 is energized and the equipment being controlled stops. Here, again, conductor 74 may be conveniently designated as the "common" conductor, conductor 72 may be conveniently designated as the normally "on" conductor, and conductor 70 may be designated as the "normally off" conductor. The switch depicted by open contact 64 may be conveniently utilized remotely instead of jumper 62, such switch being the one which the user of the equipment being controlled may close to actuate the control circuit.

It is seen that with the power applied to a circuit of FIG. 6 and with no malfunction sensed, i.e., no probe makes contacts with ground, the circuit is completed to ground from the primary winding 53 of transformer 52 through the closed contacts EF1 and EF2 and closed contacts D3 and D4, and through the electrodes of indicator light 66. When a malfunction is sensed whereby relay F is energized, the circuit of indicator light 66 is opened and the circuit is completed to ground through indicator light 68 from the upper terminal of primary winding 53 through closed contacts EF2 and EF3. In the event that there is a failure of power in the circuit of FIG. 6, i.e., no power is applied from source 5D through transformer 52, whereby relay D is not energized and its associated contacts do not shift, it is seen that the positions of the contacts associated with relay D with no power applied to the surface, are such whereby solenoid 76 is removed from circuit when conductor 72 is connected to transformer 80 and solenoid 76 is placed in circuit when conductor 70 is connected to transformer 80. Thus, in both of these conditions, the equipment being controlled stops running. Also, in the event that one of the leads 58 breaks up, for some reason or other, here again relay D is not energized and the same situation obtains in regard to the switching of the state of solenoid 76 whereby the equipment being controlled stops running.

If a malfunction has been sensed whereby relay F has been energized to effect the shifting of the positions of contacts associated in common with it and with relay E, the pressing of push button resets switch 56 causes a circuit to be completed to ground from the upper terminal of secondary winding 55 and through the operating coil of the relay E annd switch 56 to energize relay E. The latter energization effects the switching of the contacts associated with it and with relay F to their normal positions and relays E and F are latched. Thereafter the system is again conditioned for operation.

Contacts D1 and D2 may suitably be spring-loaded to ensure proper operation of the system.

While there have been shown and described above particular embodiments of this invention, it is apparent that other forms and embodiments may be made and it is contemplated in the claims to cover such modifications as fall within the scope of the invention.

What is claimed and desired to be secured by Letters Patent of the United States is:

1. An arrangement for controlling a machine, said machine including a solenoid capable of being in an electrically energized or de-energized state, said solenoid being adapted to be in one of said states to enable operation of said machine, comprising means for applying alternating current power to said arrangement, a first relay in circuit with said power applying means and a reference potential, said first relay being energized upon application of said power, a plurality of probes, a second electromagnetic relay in circuit with said power applying means and said probes, a malfunctioning of said machine causing a probe to make contact with said reference potential to complete an electrical circuit through said second relay to energize said second relay, a third relay mechanically associated with said second relay in circuit with said power applying means, first contact means associated in common with said second and third relays and normally in a first predetermined state, second contact means associated with and responsive to the energization of said first relay to electrically connect said solenoid to said arrangement when it is adapted to be in the energized state and to maintain solenoid electrically disconnected when it is adapted to be in the de-energized state, indicating means, said first contact means switching to a second state in response to the energization of said second electromagnetic relay to disconnect said solenoid when said solenoid is in the energized state and to connect said solenoid when said solenoid is in the de-energized state and to electrically connect said indicating means in circuit with said power applying means and said reference potential to actuate said indicating means, said first, second and third relays being of the alternating current operated type, said solenoid being adapted to be actuated by a second power source, said first contact means comprising two sets of first, second, and third contacts respectively, each of said first, second, and third contacts of a set being respectively in contact with each other during said first predetermined state, said second contact means comprising fourth, fifth and sixth contacts, said fifth and sixth contacts being in contact with each other when said first electromagnetic relay is in the energized state, a first, and second contact of one set of said first contact means being respectively connected to said fourth and sixth contacts of said second contact means, said fifth contact being connected to said solenoid, said solenoid being coupled to one terminal of said second power source, said third contact of said set being coupled to the other terminal of said second source.

2. The system defined in claim 1 wherein said indicating means comprises a first light having an electrode connected to said reference potential and an electrode connected to the third contact of the other set of said first contact means and a second light having an electrode connected to said reference potential and the first contact of the other set of said first contact means, the second contact of said other set being connected to said power applying means.

3. The system defined in claim 1 and further including switching means for removing from circuit said second relay concurrently connecting said third electromagnetic relay in circuit with said power applying means to energize said third relay, the energization of said third relay causing the contacts of said first contact means to assume their normal setting.

4. The system defined in claim 1 wherein there is further included means for placing said second electromagnetic relay in circuit with said power applying means and said reference potential to energize said second relay and thereby to halt the operation of said machine.

References Cited in the file of this patent

UNITED STATES PATENTS

| | | |
|---|---|---|
| 968,063 | La Balt | Aug. 23, 1910 |
| 1,149,018 | Beregh | Aug. 3, 1915 |
| 2,403,550 | Rabenda et al. | July 9, 1946 |
| 2,611,017 | Bailey | Sept. 16, 1952 |
| 2,651,031 | McConaghey | Sept. 1, 1953 |
| 2,679,307 | Koch | May 25, 1954 |
| 2,702,189 | Zugel et al. | Feb. 15, 1955 |
| 2,735,089 | Pickell | Feb. 14, 1956 |
| 2,769,973 | Denholm | Nov. 6, 1956 |
| 2,786,989 | Smith | Mar. 26, 1957 |
| 2,840,804 | Rodgers | June 24, 1958 |
| 3,030,616 | Onulak | Apr. 17, 1962 |